United States Patent
Sahai et al.

(10) Patent No.: US 11,893,808 B2
(45) Date of Patent: Feb. 6, 2024

(54) LEARNING-BASED 3D PROPERTY EXTRACTION

(71) Applicant: Mangolytics, Inc., Saratoga, CA (US)

(72) Inventors: Swupnil Kumar Sahai, Menlo Park, CA (US); Richard Hsu, Irvine, CA (US); Adith Balamurugan, Plano, TX (US); Neel Sesh Ramachandran, Los Altos, CA (US)

(73) Assignee: Mangolytics, Inc., Saratoga, CA (US)

( * ) Notice: Subject to any disclaimer, the term of this patent is extended or adjusted under 35 U.S.C. 154(b) by 233 days.

(21) Appl. No.: 17/106,499

(22) Filed: Nov. 30, 2020

(65) Prior Publication Data

US 2022/0171957 A1 Jun. 2, 2022

(51) Int. Cl.
| | |
|---|---|
| *G06V 20/64* | (2022.01) |
| *G06N 3/04* | (2023.01) |
| *G06N 3/08* | (2023.01) |
| *G06V 20/10* | (2022.01) |
| *G06V 20/40* | (2022.01) |
| *G06F 18/214* | (2023.01) |

(52) U.S. Cl.
CPC ............ *G06V 20/64* (2022.01); *G06F 18/214* (2023.01); *G06N 3/04* (2013.01); *G06N 3/08* (2013.01); *G06V 20/10* (2022.01); *G06V 20/42* (2022.01)

(58) Field of Classification Search
CPC ........ G06V 20/64; G06V 20/42; G06V 20/10; G06K 9/6256; G06N 3/04; G06N 3/08
See application file for complete search history.

(56) References Cited

U.S. PATENT DOCUMENTS

| | | | |
|---|---|---|---|
| 5,908,361 A | 6/1999 | Fisher et al. | |
| 8,734,214 B2 | 5/2014 | Hughes et al. | |
| 9,171,405 B1 | 10/2015 | Bell et al. | |
| 10,102,639 B2 | 10/2018 | Bell et al. | |
| 10,127,722 B2 | 11/2018 | Shakib et al. | |
| 10,482,679 B2 | 11/2019 | Bell et al. | |
| 10,534,962 B2 | 1/2020 | Hovden et al. | |
| 10,695,644 B2 | 6/2020 | Khazanov et al. | |
| 11,113,887 B2 * | 9/2021 | Kopeinigg | G06T 7/55 |
| 2005/0026689 A1 * | 2/2005 | Marks | G06T 7/73 463/36 |
| 2006/0287140 A1 | 12/2006 | Brandt et al. | |
| 2017/0262697 A1 * | 9/2017 | Kaps | G11B 27/022 |

(Continued)

OTHER PUBLICATIONS

Mehta, Dushyant, et al. "Vnect: Real-time 3d human pose estimation with a single rgb camera." Acm transactions on graphics (tog) 36.4 (2017): 1-14. (Year: 2017).*

(Continued)

*Primary Examiner* — Utpal D Shah
(74) *Attorney, Agent, or Firm* — Grellas Shah LLP

(57) ABSTRACT

Learning-based 3D property extraction can include: capturing a series of live 2D images of a participatory event including at least a portion of at least one reference visual feature of the participatory event and at least a portion of at least one object involved in the participatory event; and training a neural network to recognize at least one 3D property pertaining to the object in response to the live 2D images based on a set of timestamped 2D training images and 3D measurements of the object obtained during at least one prior training event for the neural network.

20 Claims, 6 Drawing Sheets

(56) References Cited

U.S. PATENT DOCUMENTS

| | | | | |
|---|---|---|---|---|
| 2017/0368439 | A1* | 12/2017 | Khazanov | A63B 24/0075 |
| 2018/0154232 | A1* | 6/2018 | Gentil | H04N 21/21805 |
| 2019/0287310 | A1* | 9/2019 | Kopeinigg | G06V 20/42 |
| 2020/0043287 | A1 | 2/2020 | Zhang et al. | |
| 2020/0057889 | A1 | 2/2020 | Lee et al. | |
| 2020/0265247 | A1* | 8/2020 | Musk | G06T 7/70 |
| 2020/0298080 | A1* | 9/2020 | Zhang | G06T 7/20 |
| 2020/0342270 | A1* | 10/2020 | Biswas | G06T 7/70 |
| 2021/0117785 | A1* | 4/2021 | Kim | G06N 3/084 |
| 2021/0150220 | A1* | 5/2021 | Ueda | G06V 20/42 |
| 2021/0264141 | A1* | 8/2021 | Chojnacki | G06T 7/292 |
| 2022/0044423 | A1* | 2/2022 | Tsizin-Goldman | G06V 20/42 |
| 2022/0109795 | A1* | 4/2022 | Tsunoda | H04N 5/23299 |
| 2022/0284712 | A1* | 9/2022 | Musk | G06V 20/58 |

OTHER PUBLICATIONS

Martin, Pierre-Etienne, et al. "Fine grained sport action recognition with twin spatio-temporal convolutional neural networks." Multimedia Tools and Applications 79.27 (2020): 20429-20447. (Year: 2020).*

Vinyes Mora, Silvia. Computer vision and machine learning for in-play tennis analysis: framework, algorithms and implementation. Diss. Imperial College London, 2018. (Year: 2018).*

Fazio, Megan, K. S. Fisher, and Tori Fujinami. "Tennis ball tracking: 3-D trajectory estimation using smartphone videos." Department of Electrical Engineering, Stanford University (2018). (Year: 2018).*

Shimizu, Tomohiro, et al. "Prediction of future shot direction using pose and position of tennis player." Proceedings Proceedings of the 2nd International Workshop on Multimedia Content Analysis in Sports. 2019. (Year: 2019).*

Owens, N. E. I. L., C. Harris, and C. Stennett. "Hawk-eye tennis system." 2003 international conference on visual information engineering VIE 2003. IET, 2003. (Year: 2003).*

Renò, Vito, et al. "A technology platform for automatic high-level tennis game analysis." Computer Vision and Image Understanding 159 (2017): 164-175. (Year: 2017).*

Qin, Zheng, et al. "ThunderNet: Towards real-time generic object detection on mobile devices." Proceedings of the IEEE/CVF international conference on computer vision. 2019. (Year: 2019).*

* cited by examiner

US 11,893,808 B2

LEARNING-BASED 3D PROPERTY EXTRACTION

BACKGROUND

A three-dimensional (3D) property pertaining to an event can be determined by deploying multiple calibrated two-dimensional (2D) cameras around the event. For example, the 3D location of a tennis ball in a tennis match can be determined by deploying multiple 2D cameras around a tennis court and calibrating the 2D cameras to triangulate the 3D location of the tennis ball during the tennis match.

SUMMARY

In general, in one aspect, the invention relates to a learning-based 3D property extractor. The learning-based 3D property extractor can include: a camera that captures a series of live 2D images of a participatory event including at least a portion of at least one reference visual feature of the participatory event and at least a portion of at least one object involved in the participatory event; and a neural network trained to recognize at least one 3D property pertaining to the object in response to the live 2D images wherein the neural network is trained to recognize the 3D property based on a set of 2D training images and 3D measurements of the object obtained during at least one prior training event for the neural network.

In general, in another aspect, the invention relates to a method for learning-based 3D property extraction. The method can include: capturing a series of live 2D images of a participatory event including at least a portion of at least one reference visual feature of the participatory event and at least a portion of at least one object involved in the participatory event; and training a neural network to recognize at least one 3D property pertaining to the object in response to the live 2D images based on a set of timestamped 2D training images and 3D measurements of the object obtained during at least one prior training event for the neural network.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
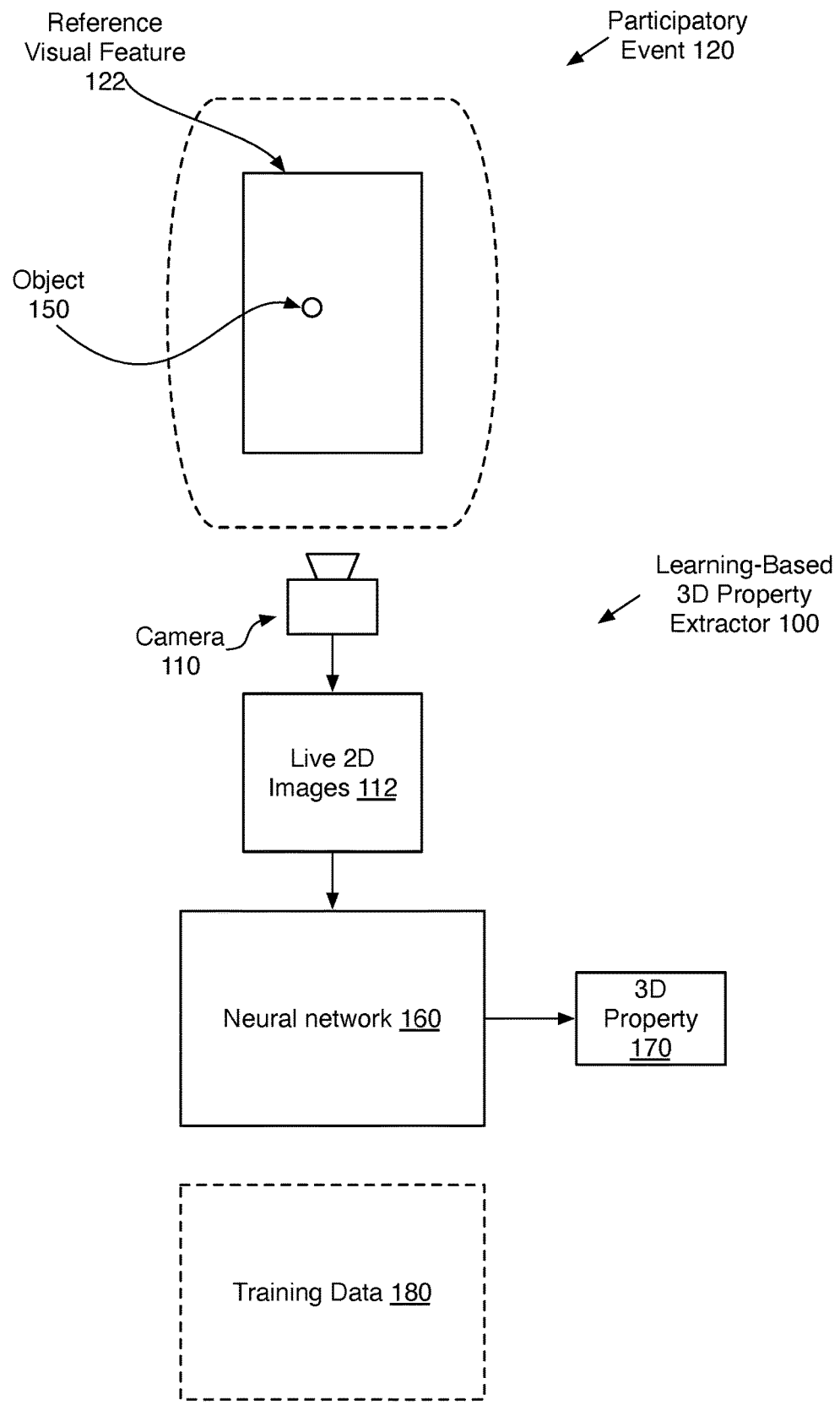
FIG. 1 illustrates a learning-based 3D property extractor in one or more embodiments.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 illustrates a learning-based 3D property extractor 100 in one or more embodiments. The learning-based 3D property extractor 100 includes a camera 110 that captures a series of live 2D images 112 of a participatory event 120.

In one or more embodiments, the participatory event 120 is a sports event. Examples of a sports event include a tennis match, a soccer match, a baseball game, a football game, a hockey game, badminton, squash, table tennis, baseball, volleyball, rugby, lacrosse, racing, rowing, golf, pretty much any participatory or spectator sport.

The camera 110 captures in the live 2D images 112 at least a portion of at least one reference visual feature 122 of the participatory event 120. In one or more embodiments, the reference visual feature 122 pertains to a regulation topology of a sports event, e.g., the regulation layout lines or other reference visual features of a tennis court, baseball diamond, football gridlines, etc.

The camera 110 also captures in the live 2D images 112 at least a portion of at least one object 150 involved in the participatory event 120. In one or more embodiments, the object 150 is a regulation object of a sports event, e.g., a tennis ball, a tennis racket, a baseball, a bat, a football, a helmet, etc. The object 150 can be a participant in the participatory event 120, e.g., a tennis player, baseball player, football player, etc. The object 150 can be an aspect of a participant in the participatory event 120, e.g., the feet or arms or head of a tennis player, baseball player, football player, etc.

The learning-based 3D property extractor 100 includes a neural network 160 trained to recognize in response to the live 2D images 112 at least one 3D property 170 pertaining to the object 150. In one or more embodiments, the 3D property 170 is a current location of the object 150 in a 3D space encompassing the participatory event 120. The 3D property 170 can be a relevant statistical or scoring event, e.g., a tennis ball landing outside of a service court, a foot fault, an incomplete pass, a ball or a strike, a personal foul in basketball, etc. The 3D property 170 can be an orientation in 3D space of the object 150. The 3D property 170 can be a 3D size of the object 150. The 3D property 170 can be a velocity in 3D space of the object 150.

The neural network 160 is trained to recognize the 3D property 170 based on a set of training data 180 including 2D training images and corresponding 3D measurements of an object captured during at least one prior training event. For example, the neural network 160 can be trained to recognize the 3D location of a tennis ball in play by acquiring 2D training images and corresponding measurements of the 3D locations of a tennis ball while in play in a training event. Likewise, the neural network 160 can be trained to recognize object orientation, object size, object velocity, etc., by acquiring 2D training images of an object during a training event and corresponding 3D measurements of object orientation, object size, object velocity, etc.

In one or more embodiments, the neural network 160 is trained to recognize arrangements of pixels in the live 2D images 112 pertaining to the object 150 and pixels in the live 2D images 112 pertaining to a regulation topology of the participating event 120. For example, the neural network 160 can be trained to correlate arrangements of pixels depicting a tennis ball and pixels depicting regulation tennis court lines to particular 3D locations in a tennis match. Likewise, the neural network 160 can be trained to correlate arrangements of pixels depicting a baseball and pixels depicting regulation baseball field visual features to corresponding baseball orientation, baseball size, baseball velocity, etc.

In one or more embodiments, the learning-based 3D property extractor 100 is implemented in a mobile device in which the camera 110 is a built-in video camera of the mobile device and the neural network 160 is coded in an app that runs on the mobile device. A mobile device based 3D property extractor can be particularly advantageous for individual users, e.g., enthusiastic amateur players, in terms of cost and portability. In one or more other embodiments, the neural network 160 can be implemented in a separate computing device from a camera device that captures the live 2D images 112.

Figure 2:
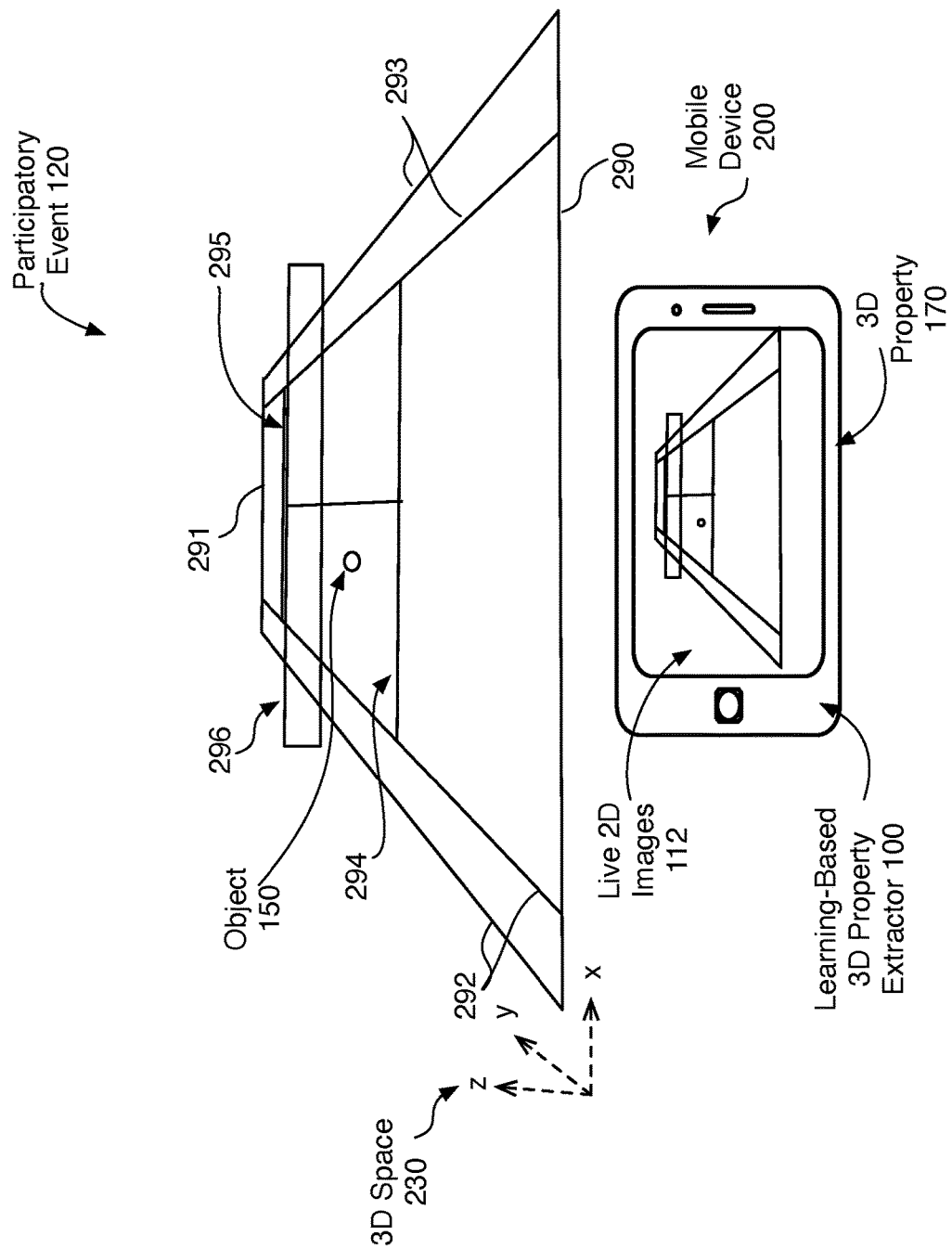
FIG. 2 shows an example embodiment of a learning-based 3D property extractor that extracts 3D properties from live 2D images of a tennis match.

FIG. 2 shows an embodiment in which the participatory event 120 is a tennis match and the object 150 is a tennis ball in play and the learning-based 3D property extractor 100 is implemented in a mobile device 200. The reference visual feature 122 is a regulation tennis court with regulation topology, e.g., baselines and sidelines service lines 290-295 and a net 296.

The mobile device 200 is placed, e.g., via a tripod, behind the baseline 290 to capture substantially all of a playable 3D space 230 of the tennis court. The x-y plane of the 3D space 230 is parallel to the surface of the tennis court and the z direction of the 3D space 230 is above and perpendicular to tennis court surface. The mobile device 200 can be mounted anywhere for a good view of a tennis match and the app that implements 3D property extractor 100 can adjust its geometry accordingly.

Figure 3:
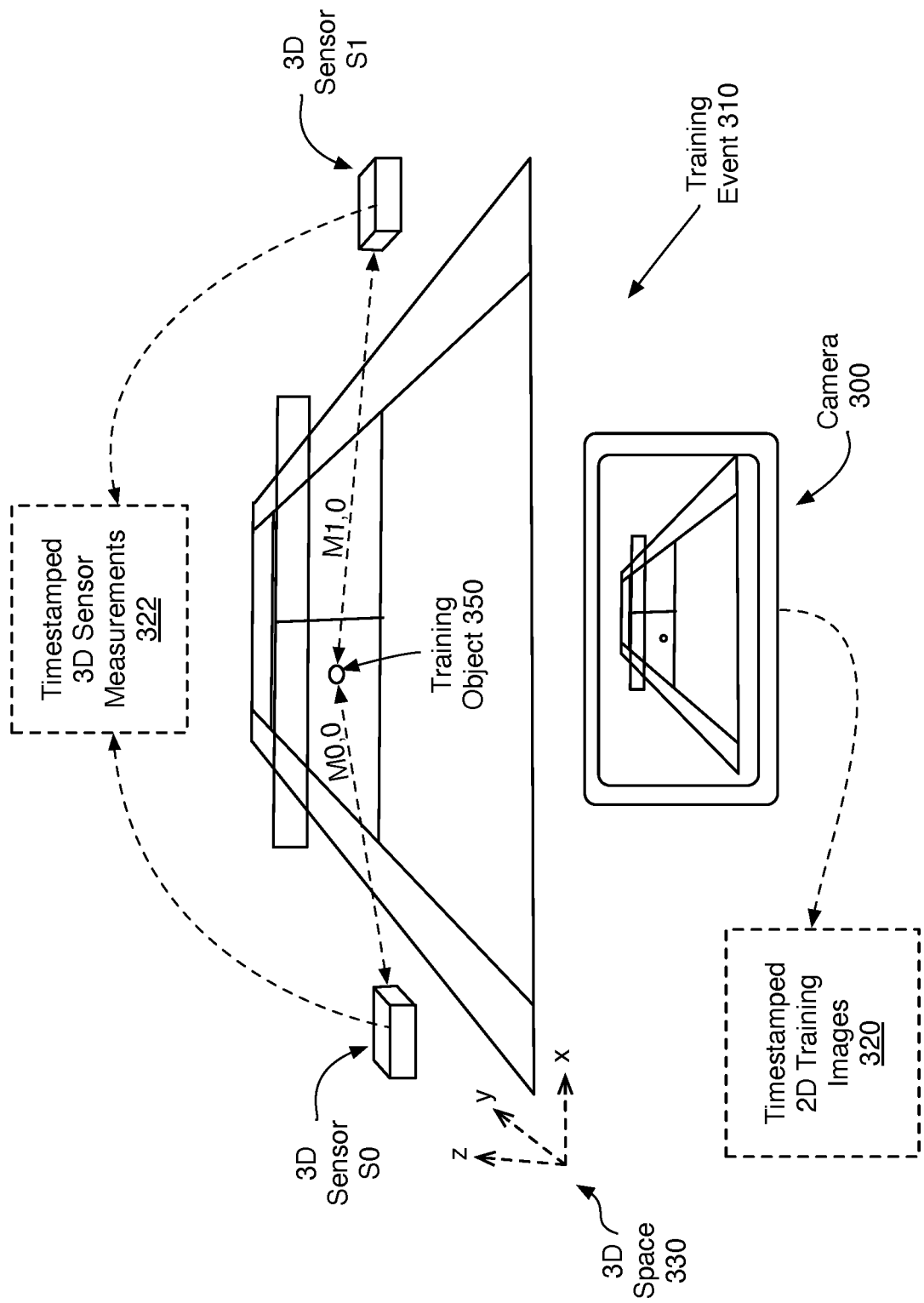
FIG. 3 shows how to acquire a set of training data for training a neural network to recognize 3D properties from live 2D images in one or more embodiments.

FIG. 3 shows how to acquire the training data 180 for training the neural network 160 in one or more embodiments. The training data 180 is acquired by outfitting a training event 310, in this example tennis play on a regulation tennis court, with a set of 3D sensors S0-S1 and a camera 300. The 3D sensors S0-S1 and the camera 300 are deployed at the training event 310 to cover substantially all of a playable 3D space 330 at the training event 310. The x-y plane of the 3D space 330 is parallel to the surface of the tennis court and the z direction is above and perpendicular to the surface of the tennis court.

The camera 300 captures a series of timestamped 2D training images 320 of a training object 350, e.g., a tennis ball in play, while the 3D sensors S0-S1 obtain a series of timestamped 3D sensor measurements 322 of the training object 350. For example, M0,0 is a 3D sensor measurement of the training object 350 in the 3D space 330 at time t0 with respect to a position of the 3D sensor S0. Likewise, M1,0 is a 3D sensor measurement of the training object 350 in the 3D space 330 at time t0 with respect to a position of the 3D sensor S1. M0,0 and M1,0 can be used to triangulate the 3D location of the training object 350 in the 3D space 330 at time t0 or determine the size, orientation, or velocity, etc., of the training object 350 in the 3D space 330 at time t0.

There can be any number of 3D sensors deployed for the training event 310 in any appropriate arrangement. In one or more embodiments, the 3D sensors S0-S1 make 3D measurements using mechanisms such as radar, Lidar, etc. In some embodiments, the 3D measurements of the training object 350 can be obtained by outfitting the training event 310 with multiple cameras that are positioned and calibrated to render 3D measurements of the training object 350.

The camera 300 can be a mobile device or another type of camera. The 3D sensors S0-S1 and the camera 300 can acquire the timestamped 2D training images 320 and the timestamped 3D sensor measurements 322 over many hours of play. In some embodiments, the training data 180 can be captured in multiple similarly outfitted training events.

Figure 4:
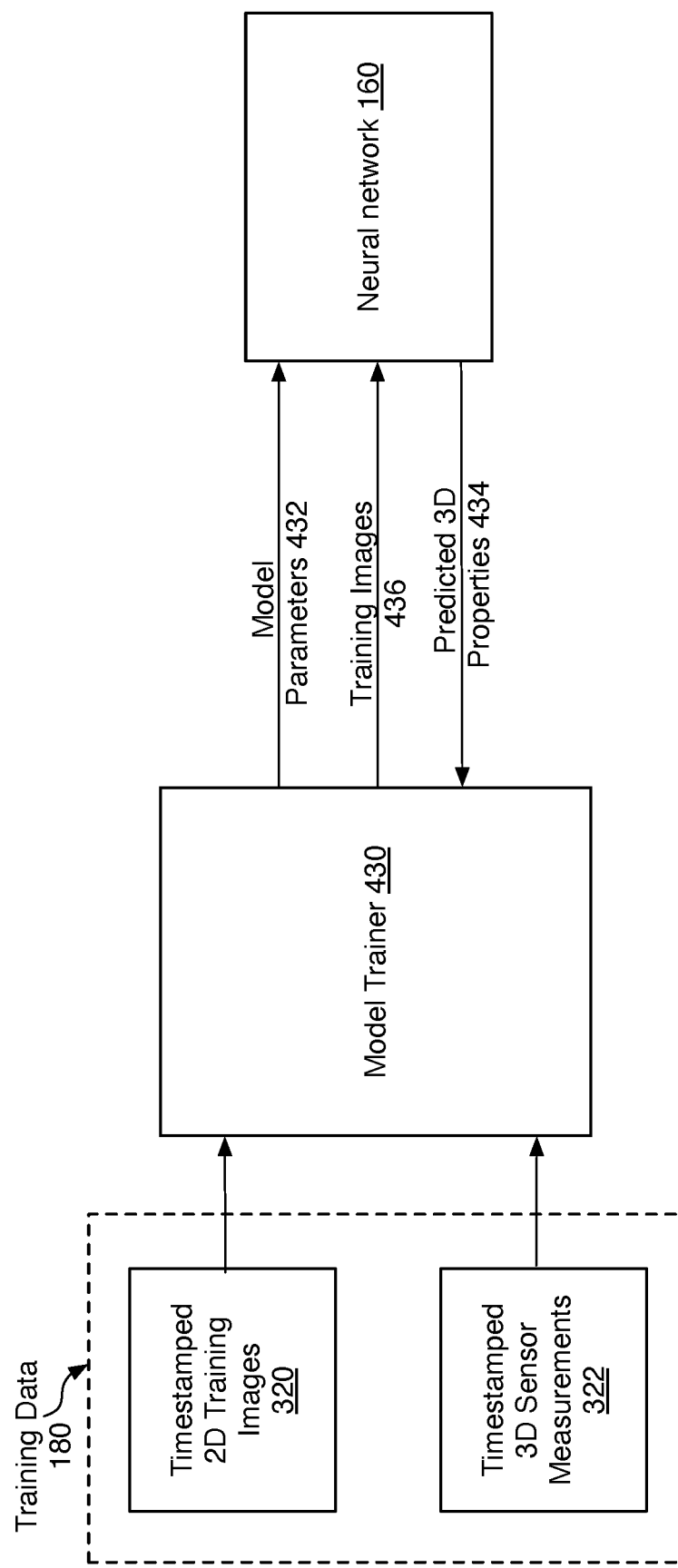
FIG. 4 shows how to use a set of training data to train a neural network to recognize 3D properties from live 2D images in one or more embodiments.

FIG. 4 shows how to use the training data 180 to train the neural network 160 in one or more embodiments. A model trainer 430 initializes and iteratively updates a set of model parameters 432 of the neural network 160. The model parameters 432 can include, e.g. node structure parameters and weights of connections among the nodes. The model trainer 430 applies a set of training images 436 obtained from the timestamped 2D training images 320 of the training data 180 to the neural network 160 and compares a set of predicted 3D properties 434 to the measured 3D properties indicated in the timestamped 3D sensor measurements 322 of the training data 180. For example, when training the neural network 160 to recognize the 3D locations of an object depicted in the training images 436 the model trainer 430 compares the predicted 3D property 434 yielded from training image 436 timestamped with time t0 to the 3D location measurements timestamped with time t0 recorded in the timestamped 3D sensor measurements 322. The model trainer 430 continues to update the model parameters 432 until there is sufficient agreement between the predicted 3D properties 434 and the actual 3D properties indicated in the timestamped 3D sensor measurements 322.

Figure 5:
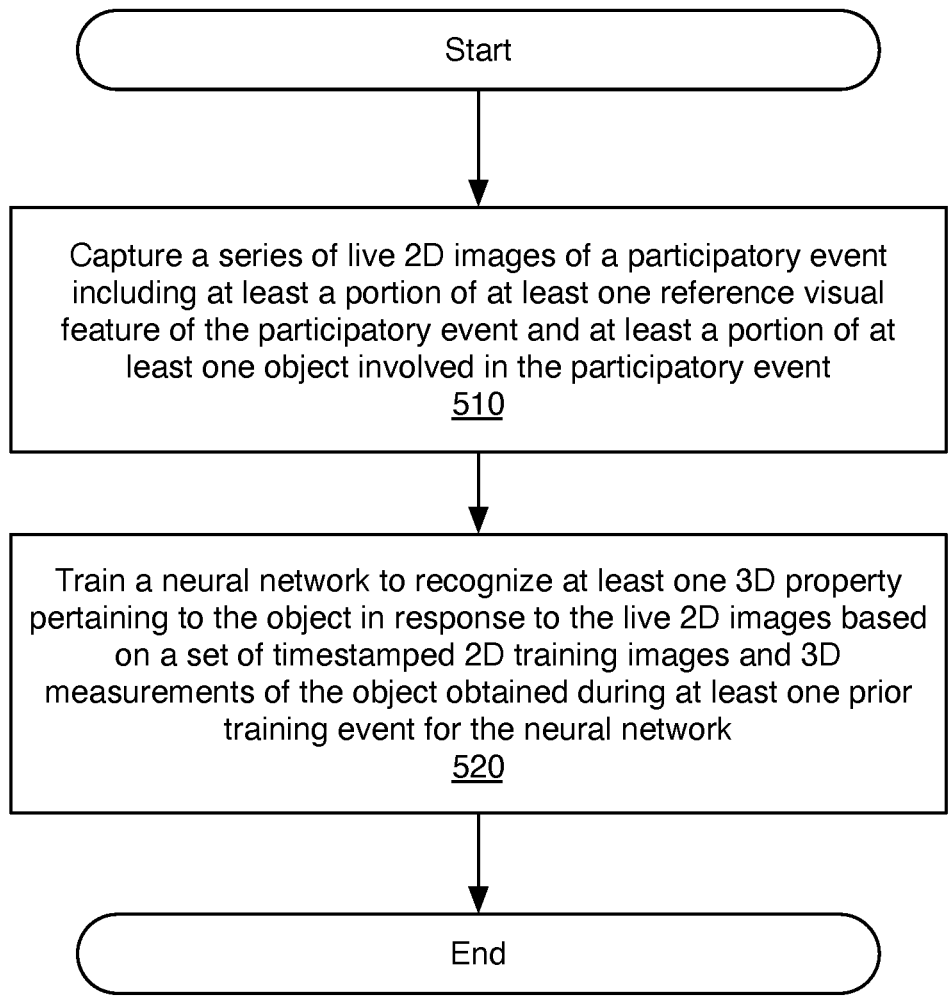
FIG. 5 illustrates a method for learning-based 3D property extraction in one or more embodiments.

FIG. 5 illustrates a method for learning-based 3D property extraction in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

At step 510, a series of live 2D images of a participatory event are captured including at least a portion of at least one reference visual feature of the participatory event and at least a portion of at least one object involved in the participatory event. The participatory event can be any participatory event, e.g., a sport event. The reference visual feature can be a regulation visual feature of the participatory event, e.g., a court or field layout of a sports event. The object can be a regulation object of the participatory event, e.g., a ball, a racquet, a bat, a club, etc., of a sport event. The object can be a player or a portion of a player's body or wearables.

At step 520, a neural network is trained to recognize at least one 3D property pertaining to the object in response to the live 2D images based on a set of timestamped 2D training images and 3D measurements of the object obtained during at least one prior training event for the neural network. The 3D property can be a 3D location of an object in a sports event, object size, orientation, velocity, or an aspect of a sports event, e.g., a statistical property such as faults, fouls, outs, penalties, goals, errors, etc.

Figure 6:
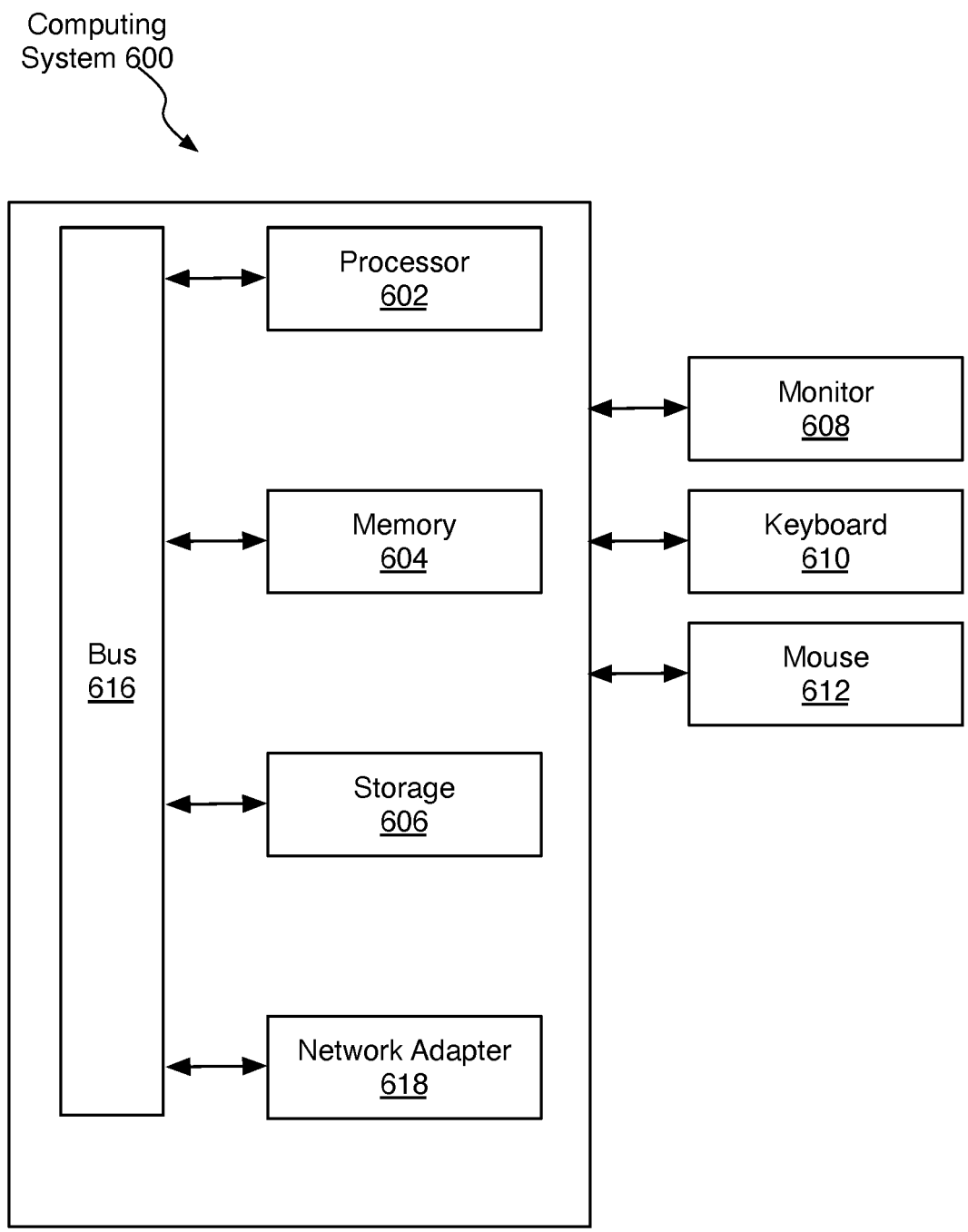
FIG. 6 illustrates a computing system upon which portions, e.g., a model trainer, of a learning-based 3D property extractor can be implemented.

FIG. 6 illustrates a computing system 600 upon which portions of the learning-based 3D property extractor 100, e.g., the model trainer 430, can be implemented. The computing system 600 includes one or more computer processor(s) 602, associated memory 604 (e.g., random access memory (RAM), cache memory, flash memory, etc.), one or more storage device(s) 606 (e.g., a hard disk, an optical drive such as a compact disk (CD) drive or digital versatile disk (DVD) drive, a flash memory stick, etc.), a bus 616, and numerous other elements and functionalities. The computer processor(s) 602 may be an integrated circuit for processing instructions. For example, the computer processor(s) may be one or more cores or micro-cores of a processor. The computing system 600 may also include one or more input device(s), e.g., a touchscreen, keyboard 610, mouse 612, microphone, touchpad, electronic pen, or any other type of input device. Further, the computing system 600 may include one or more monitor device(s) 608, such as a screen (e.g., a liquid crystal display (LCD), a plasma display, touchscreen, cathode ray tube (CRT) monitor, projector, or other display device), external storage, input for an electric instrument, or any other output device. The computing system 600 may be connected to a network (e.g., a local area network (LAN), a wide area network (WAN) such as the Internet, mobile network, or any other type of network) via a network adapter 618.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A mobile device, comprising:
a camera that captures a 2D image of a participatory event including at least a portion of a reference visual feature of the participatory event and at least a portion of an object of interest in the participatory event; and
a neural network trained to extract from the 2D image a 3D property of the object within a 3D space of the participatory event by correlating an arrangement of pixels in the 2D image that correspond to the object and an arrangement of pixels in the 2D image that correspond to the reference visual feature to the 3D property.

2. The mobile device of claim 1, wherein the mobile device is placed by a user of the mobile device in a position selected by the user for capturing the participatory event with the camera.

3. The mobile device of claim 2, wherein the user of the mobile device is a player in the participator event.

4. The mobile device of claim 1, wherein the reference visual feature pertains to a regulation topology of a sport.

5. The mobile device of claim 1, wherein the 3D property pertains to a scoring event in the participatory event.

6. The mobile device of claim 1, wherein the 3D property pertains to a statistical event in the participatory event.

7. The mobile device of claim 1, wherein the camera is a built-in camera of the mobile device and the neural network is implemented in an app that runs on the mobile device.

8. The mobile device of claim 1, wherein the 3D property pertains to a 3D location of the object in the 3D space.

9. The mobile device of claim 1, wherein the 3D property pertains to a 3D motion of the object in the 3D space.

10. A system for 3D property extraction, comprising:
a single camera positioned to capture a live video of a participatory event including at least a portion of an object of interest in the participatory event and at least a portion of a reference visual feature of the participatory event; and
a computing mechanism that implements a neural network trained to recognize a 3D property of the object within a 3D space of the participatory event in response to at least one 2D image in the live video by correlating an arrangement of pixels in the 2D image that correspond to the object and an arrangement of pixels in the 2D image that correspond to the reference visual feature to the 3D property.

11. The system of claim 10, wherein the reference visual feature pertains to a regulation topology of a sport.

12. The system of claim 10, wherein the 3D property pertains to a scoring event in the participatory event.

13. The system of claim 10, wherein the 3D property pertains to a statistical event in the participatory event.

14. The system of claim 10, wherein the 3D property pertains to a 3D location of the object in the 3D space.

15. The system of claim 10, wherein the 3D property pertains to a 3D motion of the object in the 3D space.

16. A method for 3D property extraction, comprising:
deploying a single camera positioned to capture a live video of a participatory event including at least a portion of an object of interest in the participatory event and at least a portion of a reference visual feature of the participatory event; and
providing a neural network trained to recognize a 3D property of the object within a 3D space of the participatory event in response to at least one 2D image in the live video by correlating an arrangement of pixels in the 2D image that correspond to the object and an arrangement of the pixels in the 2D image that correspond to the reference visual feature to the 3D property.

17. The method of claim 16, wherein deploying comprises deploying a mobile device with a built-in camera for capturing the live video.

18. The method of claim 17, wherein deploying is performed by a user of the mobile device who is also a participant in the participatory event.

19. The method of claim 17, wherein providing comprises providing an app for the mobile device that implements the neural network.

20. The method of claim 16, wherein providing comprises training the neural network in response to a set of 2D training images and 3D measurements of the object of interest obtained during a training event that includes the reference visual feature.

* * * * *